United States Patent Office 3,634,357
Patented Jan. 11, 1972

3,634,357
ALKALINE EARTH METAL GERMANIDE POLYCONDENSATION CATALYST FOR THE PREPARATION OF FILAMENT-FORMING POLYESTER RESINS
Mary J. Stewart, Media, and John A. Price, Swarthmore, Pa., assignors to FMC Corporation, Philadelphia, Pa.
No Drawing. Filed Nov. 12, 1969, Ser. No. 876,127
Int. Cl. C08g *17/015*
U.S. Cl. 260—75 R                          5 Claims

ABSTRACT OF THE DISCLOSURE

The preparation of filament-forming saturated linear polyester resin is effectively accomplished by carrying out the polycondensation of a polyester prepolymer in the presence of an alkaline earth metal germanide.

---

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product which may be, in general, described as a polyester prepolymer, is then polycondensed in the presence of a polycondensation catalyst to form a polyester resin.

In the case of the transesterification method of preparing polyethylene terephthalate wherein ethylene glycol is reacted with dimethyl terephthalate, the first stage product of the transesterification reaction is generally described as being comprised mainly of bis(2-hydroxyethyl) terephthalate. Whereas, the first stage reaction product of the direct esterification reaction between ethylene glycol and terephthalic acid is comprised of bis(2-hydroxyethyl) terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis(2-hydroxyethyl)terephthalate or a polycondensation product thereof, wherein the D.P. (degree of polymerization) varies from about 2 to about 6. However, for purposes of simplicity in describing the present invention, hereinafter the terms "polyester prepolymer" and "bis(2-hydroxyethyl) terephthalate" will both denote and include within their scope the product of the direct esterification reaction between terephthalic acid and ethylene glycol and the product of the transesterification reaction between dimethyl terephthalate and ethylene glycol as set forth above.

Other methods for obtaining prepolymer material which can be polycondensed to provide filament-forming polyesters broadly include, for example, reacting a salt of a dicarboxylic acid and a strong base with a halogen hydrin to form a bis-glycol ester of the dicarboxylic acid; reacting ethylene oxide with a dicarboxylic acid or a salt thereof; reacting a dicarboxylic acid with a cyclic alkylene carbonate; reacting an aromatic nitrile with an alkylene glycol; etc.

Heretofore, various materials have been suggested as polycondensation catalysts for polycondensing the polyester prepolymer products of both the transesterification method and direct esterification method of preparing polyester resins. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Obviously a short polycondensation time is desired. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of about below 50 equivalents per million grams (eq./$10^6$ gr. or meq./kg.), a birefringent melting point of about at least 258–260° C., and a intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultra-violet light stability, and a high degree of tenacity which is necessary for the use of such filaments in the manufacture of fibers such as is used in wash and wear clothing. It is desirable to manufacture polyester resins which have carboxyl contents as close to zero as possible, because there is a generally recognized direct relationship between the carboxyl content of the polyester resin and the hydrolytic, thermal, and ultra-violet light stability of the filaments and films produced therefrom. In general, the higher the carboxyl content of the polyester resin, the less hydrolytic, thermal, and ultra-violet light stability is possessed by the resulting films or filaments.

It is an object of this invention to provide a new method of preparing filament-forming saturated linear terephthalate polyester resin.

It is a further object of this invention to provide a new polycondensation catalyst for preparing polyester resins.

These and other objects are accomplished in accordance with this invention which comprises carrying out the polycondensation of prepolymer material for production of saturated linear terephthalate polyester resin in the presence of a catalytic amount of an alkaline earth metal germanide.

Alkaline earth metals generally include calcium, barium and strontium but for the purpose of this invention magnesium is also included because of its similarity of chemical nature and activity.

The polycondensation catalysts of the present invention are generally employed in amounts ranging from about 0.01% to about 0.2%, based on the weight of the polyester prepolymer to be polycondensed. Usually, it has been found that from about 0.01% to about 0.1% of the subject polycondensation catalyst is preferred in most instances. Higher or lower concentrations of the present polycondensation catalysts can also be used in the subject polycondensation reaction. However, when concentrations less than the above are used, their effectiveness is generally reduced, whereas if concentrations greater than this are used, no further improvement in the present method or desired product is generally obtained. The alkaline earth metal germanide polycondensation catalyst may be present during the preparation of the prepolymer material.

Since direct esterification and transesterification procedures are most commonly employed for the preparation of prepolymers for polyesters, general descriptions of these procedures are now set forth.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C. but preferably between about 150° C. and 200° C. in the presence of a transesterification catalyst. During the first stage of this reaction, methyl alcohol is evolved and is continuously removed by distillation. After a reaction period of about one to two hours, the temperature of the reaction mixture is raised to from about 200° C. to about 300° C. for approximately one to three hours in order to complete the reaction so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably about 1.5:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate or triethylamine may be used. The first stage catalytic additives are generally used in concentrations ranging from $5 \times 10^{-5}$ mole to about $5 \times 10^{-2}$ mole of catalytic additive per mole of terephthalic acid present in the initial terephthalic acid-glycol reaction mixture.

The term "terephthalate polyester resin" as used herein is meant to include alkylene terephthalate homopolymers and copolymers wherein the terephthalate ester segments predominate. Other dicarboxylic acids or their esters as well as dihydric alcohols other than alkylene glycols may be employed as copolymerization constituents to prepare filament-forming resins having different properties as is well-known in the art.

The following example is set forth to demonstrate this invention.

EXAMPLE

A mixture comprising 600 grams of dimethyl terephthalate, 361 mls. of ethylene glycol and 0.48 g. zinc acetate dihydrate was charged into a reaction vessel equipped with a nitrogen inlet, heating means and stirring means. The reaction mixture was agitated and heated at atmospheric pressure to 197° C. under a nitrogen blanket. The reaction was held at 197° C. until about 80% by-product methanol was removed (1–2 hours) and the temperature was increased to 230° C. over a period of about 1 hour to distill off any additional by-product methanol and excess glycol. The prepolymer product was then allowed to cool under a nitrogen atmosphere.

50 grams of the prepolymer material was mixed with 0.0073 gram of calcium germanide ($Ca_2Ge$) in a reaction vessel and heated to 280° C. under reduced pressure of 0.1 mm. of mercury while being agitated for 1.5 hours. The resin product was cooled under a nitrogen atmosphere.

The polyethylene terephthalate resin product had an intrinsic viscosity of 0.775, a carboxyl value of 43 meq./kg., a diethylene glycol content of 1.34 mol percent, a melting point of 252° C. as measured in a differential thermal analysis and, an excellent degree of whiteness.

Various changes and modifications may be made practicing this invention without departing from the spirit and scope thereof and therefore the invention is not to be limited except as defined in the appended claims.

We claim:

1. In the process of preparing filament-forming, linear, saturated alkylene terephthalate polyester resin by first preparing a prepolymer material for said polyester resin and then polycondensing said prepolymer material to a filament-forming resin, the improvement comprising carrying out the polycondensation of said prepolymer material in the presence of a catalytic amount of a germanide polycondensation catalyst of the formula $M_2Ge$ wherein M is an alkaline earth metal.

2. The process of claim 1 wherein the prepolymer material is predominantly bis(hydroxyethyl) terephthalate.

3. The process of claim 1 wherein the catalytic amount ranges from about 0.01 to about 0.2% based on the weight of the prepolymer material to be polycondensed.

4. The process of claim 1 wherein the alkaline earth metal germanide is present during the preparation of the prepolymer material.

5. The process of claim 1 wherein the alkaline earth metal is calcium.

References Cited

UNITED STATES PATENTS 2,578,660   12/1951   Auspos et al. _____ 260—75

OTHER REFERENCES

Pp. 150–159. Pascal: Nouveau Traité de Chimie Minerale, Tome VIII, Troisième Fascicule, published 1963, Masson et Cie, Paris, France.

WILLIAM H. SHORT, Primary Examiner

L. P. QUAST, Assistant Examiner